US012507690B2

(12) United States Patent
Almström et al.

(10) Patent No.: US 12,507,690 B2
(45) Date of Patent: Dec. 30, 2025

(54) INSECT NET GUIDING SYSTEM

(71) Applicant: AB LUDVIG SVENSSON, Kinna (SE)

(72) Inventors: Stefan Almström, Kinnarumma (SE);
Louise Holgersson, Öjersjö (SE)

(73) Assignee: AB LUDVIG SVENSSON, Kinna (SE)

( * ) Notice: Subject to any disclaimer, the term of this patent is extended or adjusted under 35 U.S.C. 154(b) by 0 days.

(21) Appl. No.: 18/868,198

(22) PCT Filed: May 26, 2023

(86) PCT No.: PCT/SE2023/050517
§ 371 (c)(1),
(2) Date: Nov. 22, 2024

(87) PCT Pub. No.: WO2023/229518
PCT Pub. Date: Nov. 30, 2023

(65) Prior Publication Data
US 2025/0107520 A1     Apr. 3, 2025

(30) Foreign Application Priority Data

May 27, 2022  (SE) .................... 2250640-6

(51) Int. Cl.
*A01G 9/24*     (2006.01)
*A01M 29/34*    (2011.01)
*E06B 9/52*     (2006.01)

(52) U.S. Cl.
CPC ............ *A01M 29/34* (2013.01); *A01G 9/242* (2013.01); *E06B 9/52* (2013.01)

(58) Field of Classification Search
CPC ...... E06B 9/52; E06B 9/522; E06B 2009/528; A01G 9/242; A01M 29/34
See application file for complete search history.

(56) References Cited

U.S. PATENT DOCUMENTS 1,432,135 A * 10/1922 Sylvan .................... E05F 11/12
                                                    49/113
1,778,354 A * 10/1930 Cannon .................. E05F 11/12
                                                    49/330

(Continued)

FOREIGN PATENT DOCUMENTS

CA       3219837 A1 * 11/2022 ............ E06B 9/522
DE    202014007118 U1    9/2014

(Continued)

OTHER PUBLICATIONS

International Search Report and Written Opinion mailed on Sep. 14, 2023 by the International Searching Authority for International Application No. PCT/SE2023/050517, filed on May 26, 2023, and published as WO2023229518 on Nov. 30, 2023 (Applicant—Ab Ludvig Svensson) (13 Pages).

(Continued)

*Primary Examiner* — Johnnie A. Shablack
(74) *Attorney, Agent, or Firm* — Ballard Spahr LLP

(57) ABSTRACT

Described is a netting support system adapted to span an adjustable ventilation opening, wherein the netting support system includes an insect netting to prevent passage of insects through the adjustable ventilation opening. The insect netting is pleated in an accordion-style configuration to collapse in a stacked manner when the adjustable ventilation opening is closing and to expand when the adjustable ventilation opening is opening. The netting support system further includes a guiding arrangement for the insect netting, wherein the guiding arrangement includes a stretchable wire connected to at least one net connection fixed to the insect netting. The stretchable wire maintains the insect netting in the accordion-style configuration when the insect netting spans the ventilation opening.

13 Claims, 8 Drawing Sheets

(56) References Cited

U.S. PATENT DOCUMENTS

| | | | | | |
|---|---|---|---|---|---|
| 1,858,977 | A | * | 5/1932 | Zech | B60H 1/26 |
| | | | | | 454/158 |
| 2,261,941 | A | * | 11/1941 | Persson | E06B 9/521 |
| | | | | | 160/84.04 |
| 2,311,413 | A | * | 2/1943 | Persson | E06B 9/54 |
| | | | | | 160/94 |
| 4,778,546 | A | * | 10/1988 | Kitani | B41N 1/247 |
| | | | | | 156/580.2 |
| 4,915,022 | A | * | 4/1990 | Lynch | A01G 9/242 |
| | | | | | 52/63 |
| 5,433,663 | A | * | 7/1995 | Henningsson | D03D 9/00 |
| | | | | | 454/364 |
| 5,440,833 | A | * | 8/1995 | Stoll | A01M 29/34 |
| | | | | | 43/109 |
| 5,694,996 | A | * | 12/1997 | Vigenberg | E04D 13/033 |
| | | | | | 160/84.04 |
| 6,978,820 | B2 | * | 12/2005 | Aoki | E06B 9/52 |
| | | | | | 160/84.06 |
| 7,074,124 | B2 | * | 7/2006 | Williams | F24F 7/02 |
| | | | | | 47/17 |
| 7,568,307 | B1 | * | 8/2009 | Zimhoni | A01G 9/14 |
| | | | | | 47/17 |
| 12,114,625 | B2 | * | 10/2024 | Schulte | E06B 9/522 |
| 2009/0242141 | A1 | * | 10/2009 | Trotta | E06B 9/52 |
| | | | | | 160/84.02 |
| 2011/0120029 | A1 | * | 5/2011 | Uschock | A01G 9/242 |
| | | | | | 49/324 |
| 2021/0219502 | A1 | * | 7/2021 | Schulte | E06B 9/522 |
| 2022/0298857 | A1 | * | 9/2022 | LaPlaca | E06B 9/522 |
| 2024/0044135 | A1 | * | 2/2024 | Vollebregt | A01G 9/242 |
| 2025/0107520 | A1 | * | 4/2025 | Almström | A01M 29/34 |

FOREIGN PATENT DOCUMENTS

| | | |
|---|---|---|
| EP | 1182319 A2 | 2/2002 |
| EP | 2679761 A1 | 1/2014 |
| NL | 9100117 | 8/1992 |
| NL | 2007745 | 5/2013 |
| WO | WO 2020/226496 A1 | 11/2020 |

OTHER PUBLICATIONS

International Preliminary Report on Patentability mailed on Oct. 5, 2024 by the International Searching Authority for International Application No. PCT/SE2023/050517, filed on May 26, 2023, and published as WO2023229518 on Nov. 30, 2023 (Applicant—Ab Ludvig Svensson) (14 Pages).

* cited by examiner

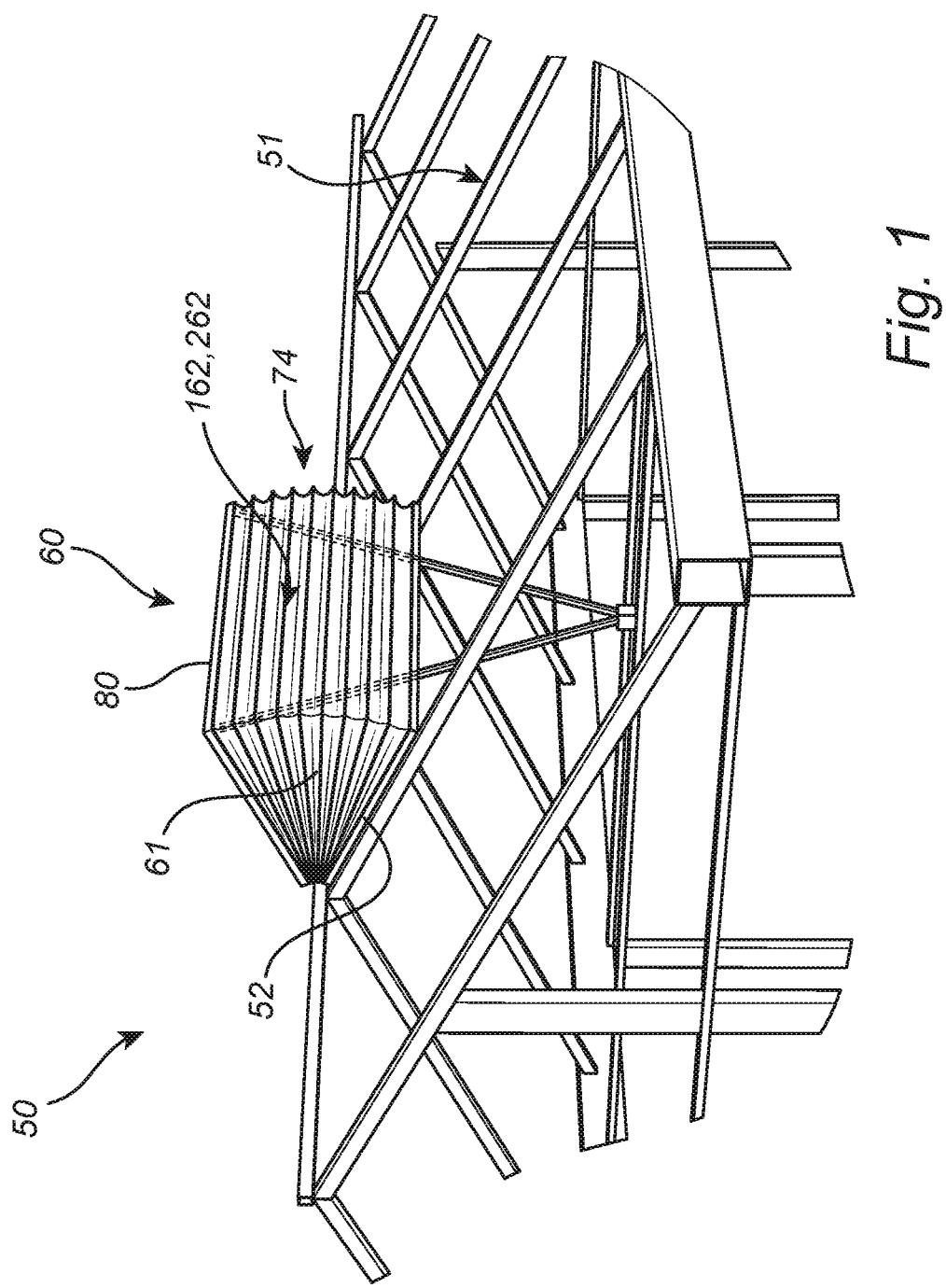

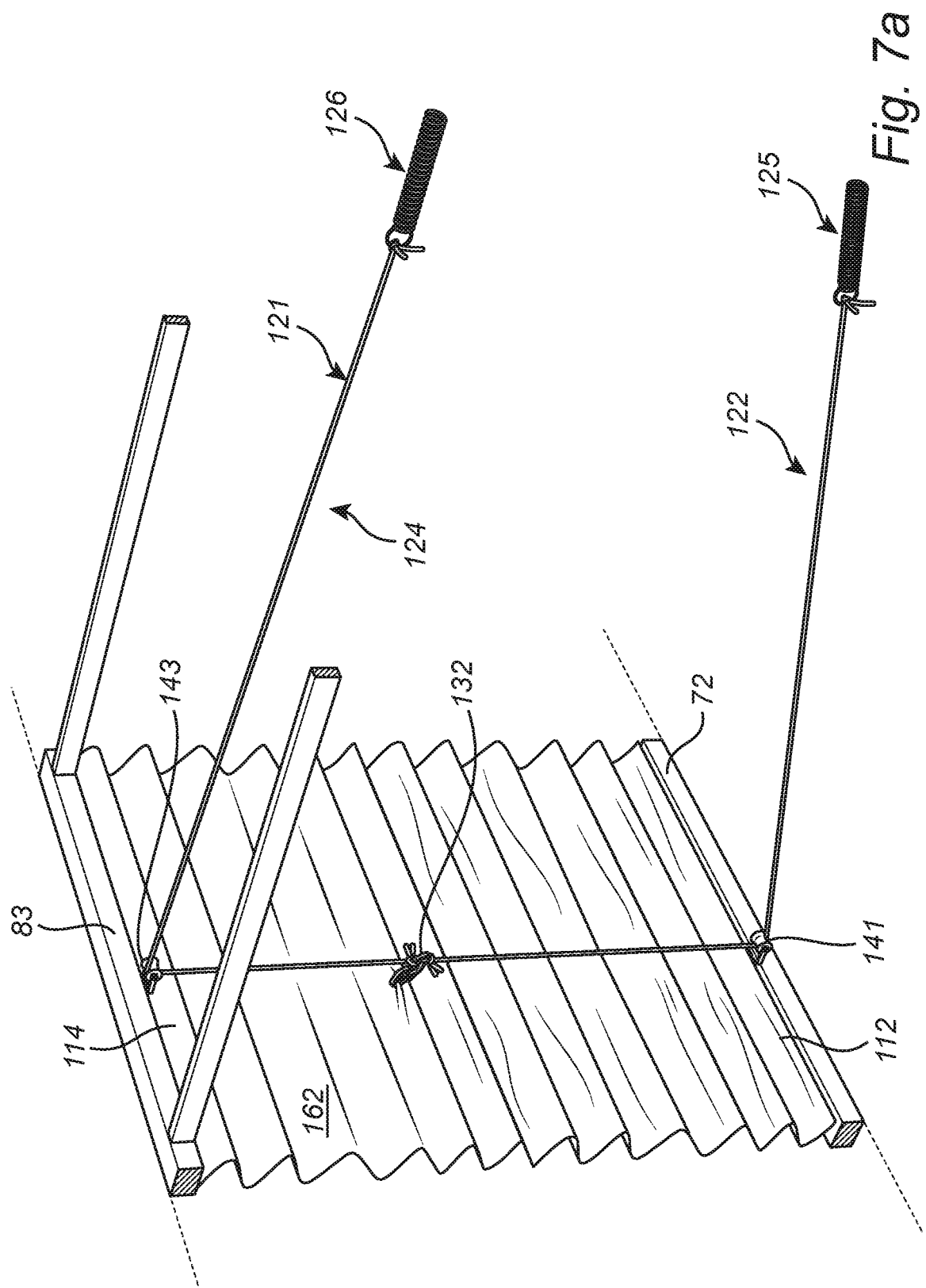

INSECT NET GUIDING SYSTEM

CROSS-REFERENCE TO RELATED APPLICATIONS

This application is a U.S. National Phase Application of International Application No. PCT/SE2023/050517, filed May 26, 2023, which claims priority to Swedish Application No. 2250640-6, filed May 27, 2022, each of which are hereby incorporated by reference in their entirety.

TECHNICAL FIELD

The present invention relates to a netting support system for facilitating the opening and closing of adjustable ventilation openings in greenhouses.

BACKGROUND OF THE INVENTION

Good ventilation inside greenhouses is of uttermost importance to alleviate problems such as elevated temperatures or humidity, or low carbon dioxide levels that may arise in the greenhouse. Roofs of conventional glass greenhouses are often provided with ventilation windows that can be opened and closed. To prevent unwanted insects from entering the greenhouse, and in some instances to keep wanted insects from leaving the greenhouse, it is often necessary to use insect nets in such ventilation openings.

Insect nets used in ventilation openings which are repeatedly opened and closed must be flexible to fill the opening when the window is opened, but it must also be able to fold out of the way of the closing window. One type of insect screen commonly used is the accordion-type screen construction as seen in FIG. 1. This accordion-type screen construction is advantageously used in ventilation openings present in greenhouses of Venlo-type to stop unwanted insects entering the greenhouse and gives a larger total net area with typically 20-40% higher air flow through the ventilation opening, than a flat net. It is also a flexible construction and is easily fixed in a greenhouse ventilation opening that is repeatedly opened and closed. An example of an accordion-style construction is described in NL1007720 (C2).

The accordion-style net constructions for roof vents (windows) in greenhouses are designed to fold neatly and form a package of a small size to not cause unwanted shadow over the crop, and to keep away from damage by metal parts when opening and closing the vent. If the insect net construction is not stiff enough, or if winds are too strong, the accordion-style construction will fall in or out of the ventilation opening and the folding of accordion-type pleats into a neat package may not work. To avoid this, some type of mechanical support is required to enable the pleated net construction to fold and unfold in an ordered manner every time the ventilation opening is opened or closed. US20210219502A1, WO2020226496 and NL2007745C2 disclose guiding systems intended to solve this issue.

However, a common problem with present guiding systems is that when the ventilation window is open, the lamellas in the upper part of the accordion-style constructions tend to stretch out in a flat configuration, while the lamellas in the lower part, due to gravity, tend to form a tightly folded stack at the bottom of the net construction. This situation prevents optimal airflow through the insect net since it is only when the lamellas form the proper accordion-type configuration that maximal airflow through the insect net is provided. Such problems may arise with less stiff insect nets having thinner yarns and thereby "better airflow". It is therefore one of the objectives of the present netting support system to alleviate this problem.

Another problem with existing solutions is the need for detailed installation on site in the greenhouse ceiling, a hot work at tall heights. Guiding systems currently on the market comprise large stiff parts that cannot be pre-mounted or packed together with the insect net construction in one unit.

SUMMARY OF THE INVENTION

An object of the present disclosure is to provide a simple and safe guiding system for insect nets arranged in ventilation openings which are repeatedly opened and closed.

The above object may be achieved with a netting support system in accordance with claim 1. A ventilation construction system, a greenhouse, and further embodiments are set out in the following description and in the drawings.

As set out herein, there is provided a netting support system adapted to span an adjustable ventilation opening. The netting support system comprises an insect netting to prevent passage of insects through the adjustable ventilation opening. The insect netting is pleated in an accordion-style configuration to collapse in a stacked manner when the adjustable ventilation opening is closing, and to expand when the adjustable ventilation opening is opening. The netting support system further comprises a guiding arrangement for the insect netting, wherein the guiding arrangement comprises a stretchable wire connected to at least one net connection fixedly attached to the insect netting. The stretchable wire maintains the insect netting in the accordion-type configuration when the insect netting spans the ventilation opening. A technical advantage of the netting support system described herein is that the lamellas in the lower part of the accordion-style construction are prevented from forming a tightly folded stack at the bottom of the net construction. This situation prevents optimal airflow through the insect net since it is only when the lamellas form the proper accordion-type configuration that maximal airflow through the insect net is provided.

In one example, the guiding arrangement comprises at least a first guiding means for the stretchable wire. The first guiding means being arranged on a first or second end of a front panel on the insect netting. The first guiding means guiding a net connecting section of the stretchable wire past the at least one net connection in a direction parallel to the front panel. A technical advantage of having the first guiding means arranged on a first or second end of a front panel on the insect netting may be that they can be pre-mounted on the netting support system already at the factory, facilitating the assembly of the netting support system on location.

In one example, the guiding arrangement comprises first and second wire attachment points for fixing a first and second end of the stretchable wire of the guiding arrangement. The first wire attachment point being arranged at a location a first distance $d_1$ from the first guiding means, whereby when the first end of the stretchable wire is attached to the first wire attachment point, the net connecting section of the stretchable wire is guided past the first guiding means extending in a first extended section of the stretchable wire towards the first wire attachment point in a direction different from the direction of the net connecting section. A technical advantage of guiding the first extended section of the stretchable wire towards the first wire attachment point in a direction different from the direction of the net connecting section may be that the relative elongation of the stretchable wire when the adjustable ventilation opening is in an open position is decreased.

In one example, the first distance $d_1$ between the first guiding means and the first wire attachment point is at least 15%, preferably at least 50% longer, more preferably at least 60% longer than a distance $d_{open}$ between the first and second ends of the front panel when the adjustable ventilation opening is in a fully open position. A technical advantage of having the first distance $d_1$ being at least 15% longer than the distance $d_{open}$ may be that the overall material strain on the stretchable wire may be drastically decreased. The decreased strain makes it possible to arrange the guiding means directly onto the insect netting of the front panel and thereby avoid mounting the netting support system onto greenhouse constructions such as window frames or support beams in ventilation openings.

In one example, the second wire attachment point for the stretchable wire is arranged on an end of the front panel opposite to the end provided with the at least first guiding means. A technical advantage of having the first and second guiding means arranged on the first and second ends of the front panel on the insect netting may be that they can be pre-mounted on the netting support system already at the factory, facilitating the assembly of the netting support system on location.

In one example, the stretchable wire has a total non-tensioned length $l_w$ which is 1-10%, preferably 3-6%, shorter than the first distance $d_1$ extending between the first guiding means and the first attachment point. A technical advantage of having a stretchable wire which is 1-10%, preferably 3-6%, shorter than the first distance $d_1$ extending between the first guiding means and the first attachment point may be that the stretchable wire will be maintained in a tensioned state, regardless of whether the adjustable ventilation opening is in a fully open or closed position, or somewhere in between.

In one example, the guiding arrangement comprises a second guiding means for the stretchable wire. The first and second guiding means are arranged on opposite ends of the front panel and guiding the net connecting section of the stretchable wire between the first and second guiding means in a direction parallel to the front panel, the at least one net connection being arranged between the first and second guiding means. A technical advantage may be that the at least one net connection may prevent the insect netting of the front panel from being caught by the wind. The at least one net connection may also aid the folding and unfolding of pleats during the opening and closing of the adjustable ventilation opening.

In one example, the second wire attachment point for the stretchable wire is arranged at a location a second distance $d_2$ from the second guiding means, whereby when the second end of the stretchable wire is attached to the second wire attachment point, the net connecting section of the stretchable wire is guided past the second guiding means extending in a second extended section of the stretchable wire towards the second wire attachment point in a direction different from the direction of the net connecting section. A technical advantage of guiding also the second extended section of the stretchable wire towards the second wire attachment point in a direction different from the direction of the net connecting section may be that the relative elongation of the stretchable wire when the adjustable ventilation opening is in an open position is decreased.

In one example, the sum of the first distance $d_1$ extending between the first guiding means and the first attachment point, and the second distance $d_2$ extending between the second guiding means and the second attachment point is at least 50%, preferably at least 100% longer than the distance $d_{open}$ between the first and second ends of the front panel when the adjustable ventilation opening is in a fully open position. A technical advantage of having the sum of $d_1$ and $d_2$ being at least 50% longer than the distance $d_{open}$ may be that the overall material strain on the stretchable wire may be drastically decreased. The decreased strain makes it possible to arrange the guiding means directly onto the insect netting of the front panel and thereby avoid mounting the netting support system onto greenhouse constructions such as window frames or support beams in ventilation openings.

In one example, the stretchable wire has a total non-tensioned length $l_w$ which is 1-10%, preferably 3-6%, shorter than the sum of the first distance $d_1$ extending between the first guiding means and the first attachment point, and the second distance $d_2$ extending between the second guiding means and the second attachment point. A technical advantage of having a stretchable wire which is 1-10%, preferably 3-6%, shorter than the sum of $d_1$ and the second distance $d_2$ may be that the stretchable wire will be maintained in a tensioned state, regardless of whether the adjustable ventilation opening is in a fully open or closed position, or somewhere in between.

In one example, the at last one net connection is a fixed connection fixedly attached to the insect netting and the stretchable wire between the first and second ends of the front panel.

In one example, the fixed lifting point is preferably arranged on the insect netting at ⅓ to ⅔ of the distance from the first end to the second end of the front panel. A technical advantage may be that the fixed connection enables the stretchable wire to lift the lower pleats of the front panel when the adjustable ventilation opening is in an open position. This facilitates maintaining all the pleats of the front panel in an accordion-style formation and thereby provide a higher airflow through the insect netting.

In one example, the at last one net connection is a sliding connection fixedly attached to the insect netting between the first and second ends of the front panel, the sliding connection guiding the stretchable wire therethrough and parallel to the front panel. A technical advantage may be that the sliding connections may provide mechanical support points between the stretchable wire and the front panel, but still allow the pleats of the front panel to slide along the stretchable wire during opening and closing of the ventilation opening.

In one example, the stretchable wire is an elastic wire. A technical advantage may be that elastic wires are cheap and readily available in different dimensions on the market. In one example, the stretchable wire is only partly elastic.

Also described herein is an adjustable ventilation construction comprising a first framework that defines a ventilation opening in a surface of a greenhouse and a rectangular ventilation window that covers the ventilation opening. The ventilation window is hingeably connected to the first framework to hinge around a hinge axis between a closed position in which the ventilation window extends substantially parallel to the surface of the greenhouse, and an open position in which the ventilation window is oriented oblique with respect to the surface to form a ventilation passage.

The first framework comprises two parallel side support beams and parallel front and back support beams wherein the back support beam is hingeably connected to said ventilation window. The ventilation window comprises a windowpane and a second framework along at least a distal front edge, a back edge and two parallel side edges of the windowpane. An insect net provided with the netting support system as described herein spans the ventilation opening providing an improved airflow through the insect net, while at the same time preventing passage of insects through the ventilation opening. A technical advantage of the adjustable ventilation construction may be that the netting support system described herein may be pre-mounted directly on the ventilation construction and thereafter the ventilation construction including the netting support is mounted in the greenhouse on location.

A greenhouse comprising ventilation openings provided with the netting support system is also disclosed.

BRIEF DESCRIPTION OF THE DRAWINGS

In the following detailed description, aspects of the netting support system as disclosed herein can be better understood with reference to the following drawings. The components in the drawings are not necessarily drawn to scale, emphasis is instead being placed on clearly demonstrating the underlaying principles of the disclosure. In the figures like numerals designate corresponding parts throughout the views.

FIG. 1 is an exemplary view of a roof of Venlo-type greenhouse comprising ventilation openings.

FIG. 7a is a view of the netting support system described in Example 2.

DETAILED DESCRIPTION

Figure 2A:
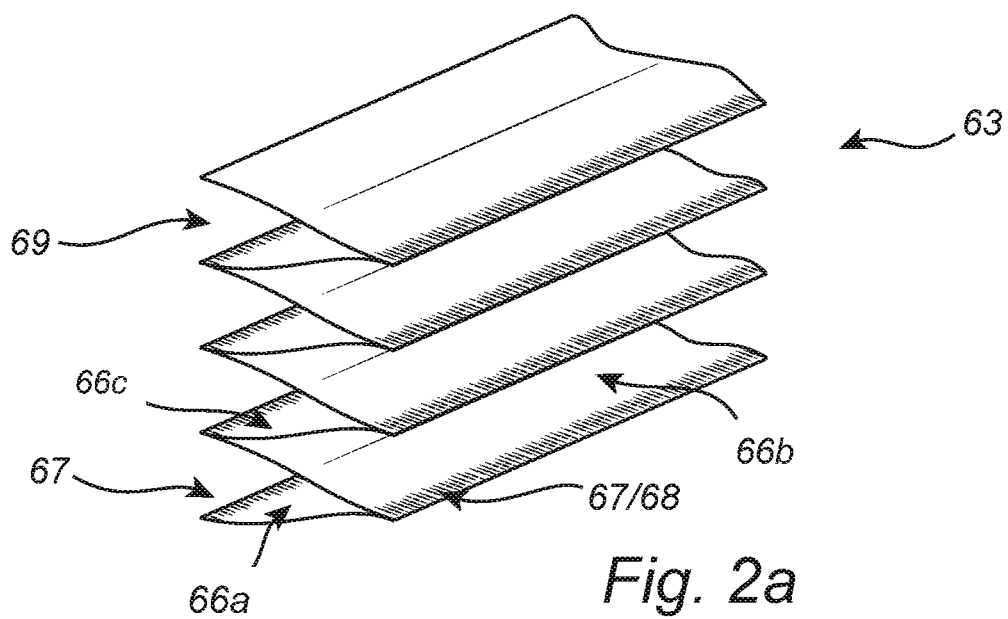
FIGS. 2a-2c is an exemplary view of the steps for assembling accordion-style assemblies from insect net strips.

In the following the invention will be described in a non-limiting way and in more detail with reference to exemplary embodiments illustrated in the enclosed drawings. It is to be understood that other embodiments are contemplated and may be made without departing from the scope of the present invention. The following detailed description, therefore, is not to be taken in a limiting sense.

FIG. 1 is a view of a greenhouse 50 of Venlo-type comprising adjustable ventilation openings 74 arranged on the roof 51. The adjustable ventilation openings 74 are provided with accordion-style ventilation screens 60 to prevent passage of insects through the ventilation opening 74, while at the same time providing optimal airflow therethrough. Such accordion-type ventilation screens 60 increase the total area of ventilation through an opening compared to a flat net covering the same opening, while at the same time preventing passage of insects.

The insect netting used in the accordion-style ventilation screens 60 referred to herein can be any regular insect net commonly used for preventing insects from entering or exiting greenhouses. The insect netting is advantageously cut into net strips having a length equalling the width of the ventilation opening and a width of 50-100 mm, preferably a width of 60-80 mm and connected into accordion-type assemblies 63 which thereafter are assembled into accordion-style ventilation screens 60.

Accordion-type assemblies 63 used in accordion-style ventilation screens 60 are typically manufactured by assembling two insect net strips or lamellas 66a, 66b flat on top of each other forming pleats 69 as seen in FIG. 2a. The insect net strips 66a, 66b are sewn together along one longitudinal edge 67, 68 at the most 10 mm from the edge 67, 68. An additional insect net strip 66c is put on top of the first two and sewn together with the upper most insect net strip 66b along the opposite longitudinal edge 67, 68 in the same way. This is repeated with the desired number of insect net strips 66a, 66b to form an accordion-style assembly 63 as seen in FIG. 2a.

Figure 2B:
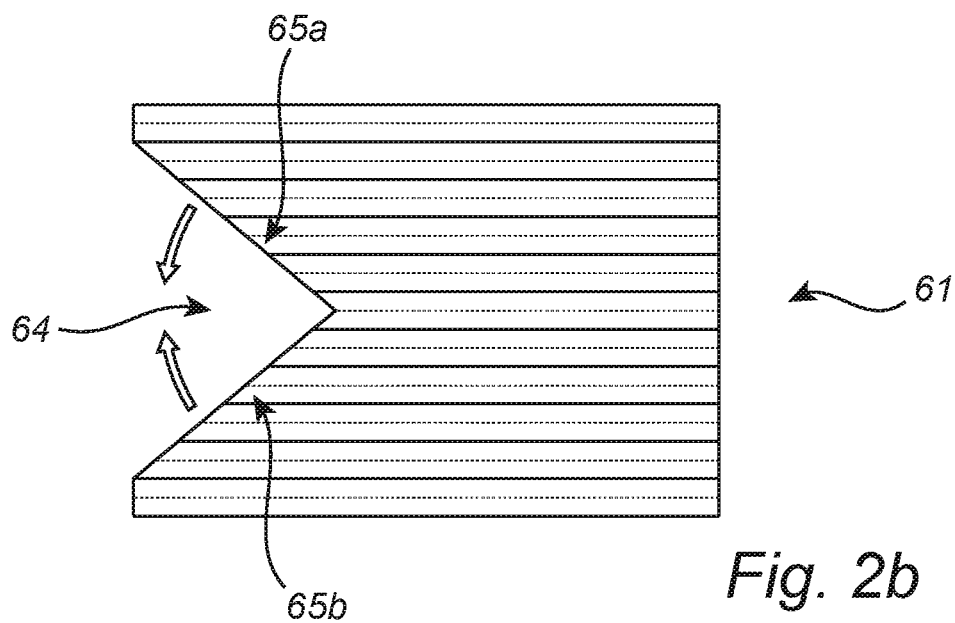
Figure 2C:
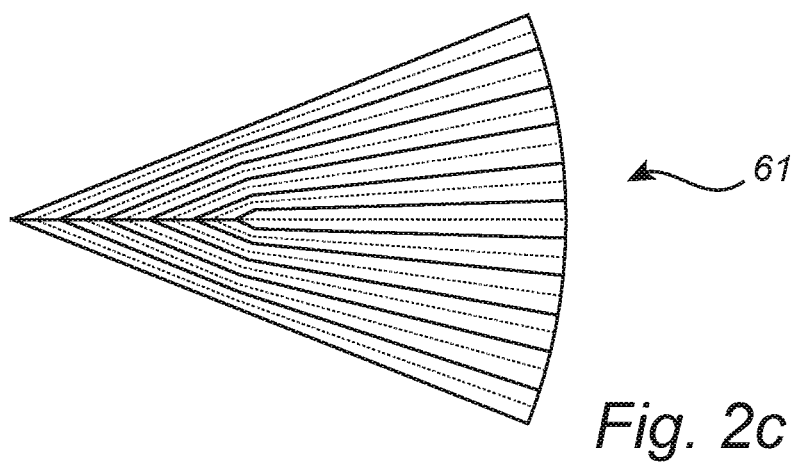

Accordion-style ventilation screens 60 comprise a front panel 162, 262 connected to two side panels 61. For the side panels 61, a triangular recess 64 is cut from the accordion-style assembly 63 as can be seen in FIG. 2b. The edges 65a, 65b along the recess 64 are connected as shown by the arrows, thereby forming a side panel 61 as shown in FIG. 2c that can be coupled to the front panel 162, 262 to form the accordion-style ventilation screen 60.

As seen in FIG. 1, the accordion-style ventilation screen 60 spans the ventilation opening 74 between the roof construction 52 and the ventilation window 80. At a first end, the accordion-style ventilation screen 60 is connected to the roof construction 52, and at the second end the accordion-style ventilation screen 60 is connected to the ventilation window 80.

Figure 3:
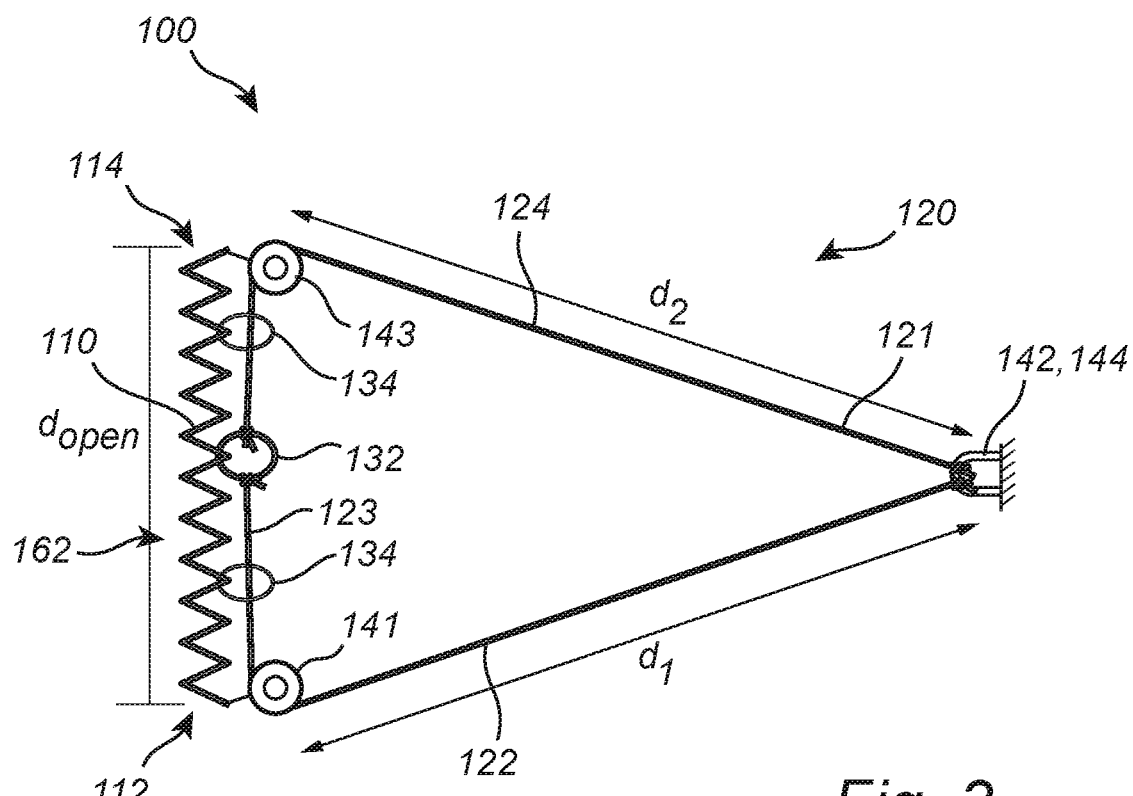
FIG. 3 is a schematic drawing of a netting support system as described herein according to one example.
Figure 4:
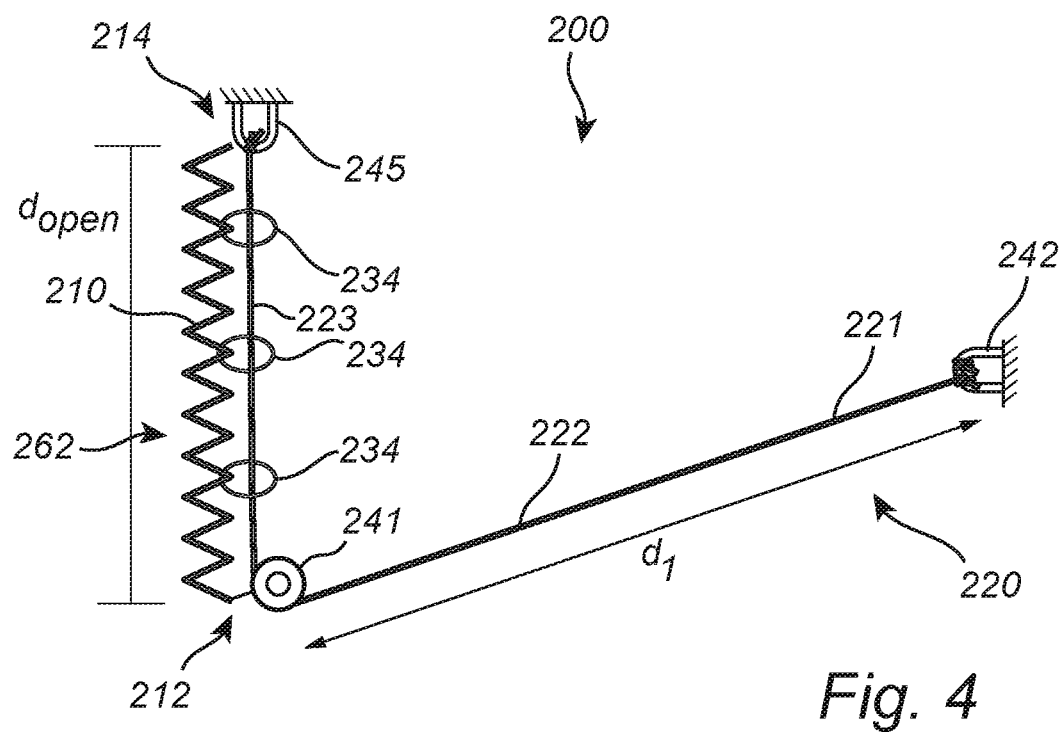
FIG. 4 is a schematic drawing of an alternative netting support system according to one example as described herein.
Figure 5:
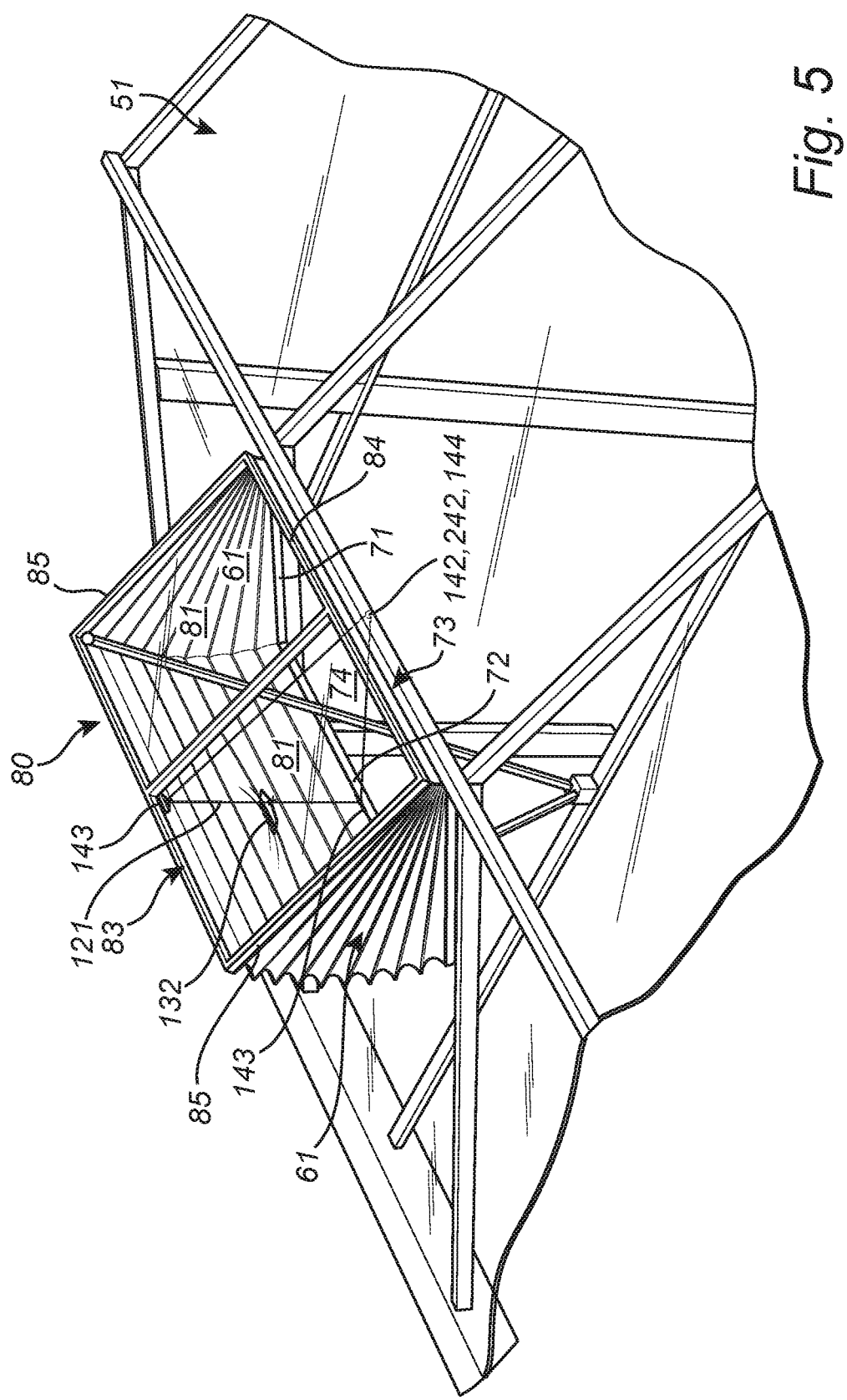
FIG. 5 is an exemplary view of a ventilation opening comprising a netting support system described herein according to one example.

To ensure proper folding and unfolding of net lamellas 69 in the accordion-style ventilation screens 60 during the opening and closing of the ventilation opening 74, the accordion-style ventilation screens 60 are provided with a netting support system 100, 200 as seen in FIGS. 3 and 4. The netting support system 100, 200 described herein enable the pleats 69 (see FIG. 2a) to collapse in a stacked manner when the adjustable ventilation opening 74 is closing, and to expand when the adjustable ventilation opening 74 is opening.

Advantageously the insect net strips 66 are made from a fine mesh gauze material which is stiff enough, such that no undesired creases or folds will form when the accordion-style assemblies 63 are folded shut, and the individual insect net strips 66 will lie flat against each other. However, in strong winds or in cases wherein less stiff insect net material is used, the accordion-style construction may fall in or out of the ventilation opening and the package of neatly stacked insect net strips 66 may not form properly during closing of the ventilation opening 74. To remedy this problem, the netting support system 100, 200 comprises a guiding arrangement 120, 220 as disclosed herein to ensure that the pleated insect netting 110, 210 is properly unfolded and collapsed whenever the ventilation window 80 is opened or closed.

The guiding arrangement 120, 220 comprises a stretchable wire 121, 221 which extends parallel to, and on the inside of the front panel 162, 262 of the accordion-style ventilation screen 60 (see FIGS. 3 and 4). The stretchable wire 121, 221 has a first end and a second end and is connected to at least one net connection 132, 134, 234 fixed to the insect netting 110, 210 somewhere between the first and the second ends 112, 212, 114, 214 of the front panel 162, 262. The at least one net connection 132, 134, 234 between the stretchable wire 121, 221 and the front panel 162, 262 prevents the insect netting 110, 210 from being caught by the wind, and helps to maintain the pleats 69 in the accordion-style configuration when the front panel 162, 262 spans the ventilation opening 74.

The stretchable wire 121, 221 may be an elastic wire made from an elastic material which can be stretched into a tensioned state and, which when the tension is released, attains its original shape and size. The term "a stretchable wire" means a wire capable of stretching (elongate) to at least 125% of its initial length in the longitudinal direction without breaking. A wire made from rubber is an example of a stretchable wire 121, 221. The stretchable wire 121, 221 may also be a stiff wire, such as a polyester rope connected to an elastic means such as a steel spring in one or both ends.

Many variations of this type of stretchable wire can be used, but three properties must be considered when choosing the stretchable wire of the guiding arrangement 120, 220 as disclosed herein: the stiffness, resistance to the harsh greenhouse environment, and the abrasion properties. The stiffness is needed for the guiding function since strong forces may cause unnecessary tension to other parts of the construction. The greenhouse environment is challenging because of the sunlight, high temperature and high humidity and therefore the stretchable wire must be made from a material that will withstand tough conditions for a time period of several years. Since the ventilation openings are repeatedly opened and closed, sometimes several times per day, good resistance towards abrasion is vital because the stretchable wire 121, 221 constantly rubs against different parts of the guiding arrangement.

Preferably the stretchable wire 121, 221 is made from rubber and is enclosed by a textile braid. The textile braid protects the rubber from mechanical wear and degradation in the sun.

The guiding arrangement 120, 220 further comprises at least a first guiding means 141, 241 for the stretchable wire 121, 221 arranged on a first end 112, 212, of the front panel 162, 262. The first guiding means 141, 241 guides a net connecting section 123, 223 of the stretchable wire 121, 221 past the at least one net connection 132, 134, 234 in a direction which extends parallel to the front panel 162, 262.

The guiding means may be a loop, a hook, bracket, or simply an eye with an opening through which the stretchable wire 121, 221 may be guided. It is important that low friction is provided between the guiding means and the stretchable wire 121, 221, and advantageously the guiding means is a sliding roller or a runner that will provide a large bending radius and low friction for the stretchable wire 121, 221 when it slides on the guiding means.

The first guiding means 141, 241 is arranged on the first end 112, 212 of the front panel 162, 262. This means that the first guiding means 141, 241 may be arranged directly onto the insect netting 110, 210 close to the first end 112, 212 of the front panel 162, 262, or onto a front support beam 72 of the ventilation opening 74. When arranged directly onto the insect netting 110, 210 of the front panel 162, 262, the first guiding means 141, 241 is advantageously a loop or an eyelet through which the stretchable wire 121, 221 may run.

The guiding arrangement 120, 220 comprises a first and a second wire attachment point 142, 242, 144 for connecting the first and second ends of the stretchable wire 121, 221.

The first wire attachment point 142, 242 is arranged at a location a first distance $d_1$ from the first guiding means 141, 241 such that when the first end of the stretchable wire 121, 221 is attached to the first wire attachment point 142, 242, the net connecting section 123, 223 of the stretchable wire 121, 221 is guided past the first guiding means 141, 241 and extends into a first extended section 122, 222 of the stretchable wire 121, 221 and towards the first wire attachment point 142, 242 in a direction different from the direction of the net connecting section 123, 223.

In one embodiment the guiding arrangement 120 comprises a second guiding means 143 for the stretchable wire 121 arranged on the second end 114 of the front panel 162 (see FIG. 3). The second guiding means 143 is arranged directly onto the insect netting 110 close to the second end 114 of the front panel 162, or onto a distal front edge 83 of the ventilation window 80. In this embodiment the first and the second guiding means 141, 143 are arranged on opposite ends 112, 114 of the front panel 162 and guide the net connecting section 123 of the stretchable wire 121 in a direction parallel to the front panel 162 between the first and second guiding means 141, 143, wherein the at least one net connection 132, 134 is arranged between the first and second guiding means 141, 143.

The second end of the stretchable wire 121 is attached to the second wire attachment point 144 which is arranged at a location a second distance $d_2$ from the second guiding means 143, such that when the second end of the stretchable wire 121 is fixed to the second wire attachment point 144, the net connecting section 123 of the stretchable wire 121 is guided past the second guiding means 143 and extends into a second extended section 124 of the stretchable wire 121 towards the second wire attachment point 144 in a direction which is different than the direction of the net connecting section 123.

FIG. 3 is a view of a netting support system 100 comprising a guiding arrangement 120 wherein a first end of the stretchable wire 121 is fixed to the first wire attachment point 142 located at a first distance $d_1$ from the first guiding means 141. A first extended section 122 of the stretchable wire 121 extends from the first wire attachment means 142 towards the first guiding means 141 arranged on a first end 112 of the front panel 162. The stretchable wire 121 is guided past the first guiding means 141 and continues in a net connecting section 123 which extends in a direction parallel to the front panel 162 past the at least one net connection 132, 134 and towards the second guiding means 143. Thereafter the stretchable wire 121 is guided past the second guiding means 143 and extends into a second extended section 124 of the stretchable wire 121 towards the second wire attachment point 144 for the stretchable wire 121. The second wire attachment point 144 is located a second distance $d_2$ from the second guiding means 143. The second end of the stretchable wire 121 is fixed to the second wire attachment point 144.

In the embodiment of FIG. 3, the sum of the first distance $d_1$ extending between the first guiding means 141 and the first wire attachment point 142, and the second distance $d_2$ extending between the second guiding means 143 and the second wire attachment point 144, is at least 50%, preferably at least 100% longer than the distance $d_{open}$ between the first and second ends 112, 114 of the front panel 162 when the adjustable ventilation opening 74 is in a fully open position. Advantageously the sum $d_1+d_2$ is from about 50 to about 150%, preferably from about 60% to about 130%, more preferably from about 70% to about 120%, more preferably from about 80% to about 110% longer than $d_{open}$.

FIG. 4 is a view of an alternative netting support system 200 wherein the guiding arrangement 220 comprises only a first guiding means 241. The first guiding means 241 may be arranged either on the first or on the second end 212, 214 of the front panel 262. This means that the first guiding means 241 may be arranged directly onto the insect netting 210 close to the first end 212 of the front panel 262, or onto the front support beam 72 of the ventilation opening 74, or close thereto. Alternatively, the first guiding means 241 may be arranged directly onto the insect netting 210 close to the second end 214 of the front panel 262, or onto the distal front edge 83 of the ventilation window 80. Advantageously the guiding means is arranged directly onto the pleated insect netting 210 of the front panel 262 either at the first or second end 212, 214 thereof. When arranged directly onto the insect netting 210 of the front panel 262, the first guiding means 241 is advantageously a loop or an eyelet through which the stretchable wire 221 may run.

In the embodiment of FIG. 4, the guiding arrangement 220 does not include a second extended section of the stretchable wire 221. Instead, the second wire attachment point 245 is arranged on the end 212, 214 of the front panel 262 opposite to the end provided with the first guiding means 241. For example, if the first guiding means 241 is arranged on a first end 212 of the front panel 262, the second wire attachment point 245 for the stretchable wire 221 is arranged on the second end 214. Alternatively, the first guiding means 241 is arranged on the second end 214 of the front panel 262 and the second wire attachment point 245 is arranged on the first end 212.

In FIG. 4 the netting support system 200 comprises a guiding arrangement 220 wherein a first end of the stretchable wire 221 is attached to the first wire attachment point 242 located at a first distance $d_1$ from the first guiding means 241 as described for the embodiment in FIG. 3. A first extended section 222 of the stretchable wire 221 extends from the first wire attachment point 242 towards the first guiding means 241 arranged on a first end 212 of the front panel 262. The stretchable wire 221 is guided around the first guiding means 241 and continues in a net connecting section 223 of the stretchable wire 221 in a direction parallel to the front panel 262, past the at least one net connection 234 and towards the second wire attachment point 245 for the stretchable wire 221. The second end of the stretchable wire 221 is fixed to the second wire attachment point 245 arranged at the second end 214 of the front panel 262.

In this embodiment the first distance $d_1$ between the first guiding means 241 and the first wire attachment point 242 is at least 15%, preferably at least 50%, more preferably at least 60% longer than the distance $d_{open}$ between the first and second ends 212, 214 of the front panel 262 when the adjustable ventilation opening 74 is in a fully open position. Advantageously $d_1$ is from about 15% to about 110%, preferably from about 30% to about 100%, more preferably from about 40% to about 90%, more preferably from about 50% to about 80% longer than $d_{open}$.

As can be seen for both embodiments, the wire attachment points 142, 242, 144 are arranged in a direction from the first and/or second guiding means 141, 241, 143, such that when the first and second ends of the stretchable wire 121, 221 are fixed to the wire attachment points 142, 242, 144, the extended sections 122, 222, 124 of the stretchable wire 121, 221 extend from the first and/or second guiding means 141, 241, 143 in a direction which is preferably not parallel to the net connecting section 123, 223 of the stretchable wire 121, 221.

In FIG. 3, the net connecting section 123 of the stretchable wire 121 extends in a direction parallel to the front panel 162, and at each of the first and second ends 112, 114 of the front panel 162, the net connecting section 123 is guided past the first and second guiding means 141, 143 such that the first and second extended sections 122, 124 extend in a direction forming an angle of less than 180° but more than 0° to the net connecting section 123, such as 130° or less but at least 20° or more, such as 100° or less but at least 50° or more to the net connecting section 123 which extends parallel to the front panel 162.

A similar situation applies for the first extended section 222 in FIG. 4, wherein the net connecting section 223 extends parallel to the front panel 262 and is guided past the first guiding means 241 and extends as a first extended section 222 towards the first attachment point 242 in a direction forming an angle of less than 180° but more than 0° to the net connecting section 223, such as 130° or less but at least 20° or more, such as 100° or less but at least 50° or more to the net connecting section 223.

For both embodiments, the stretchable wire 121, 221 is connected to the front panel 162, 262 by means of at least one net connection 132, 134, 234 (see FIGS. 3 and 4). As explained above, the at least one net connection 132, 134, 234 between the stretchable wire 121, 221 and the front panel 162, 262 prevents the front panel 162, 262 from bellowing in and out through the adjustable ventilation opening 74 during windy days. The at least one net connection 132, 134, 234 also ensures that the insect netting 110, 210 is properly unfolded and collapsed whenever the ventilation window 80 is opened or closed.

Due to gravity, the pleats 69 in the accordion-style assemblies tend to form tight stacks at the lower (first) end 112, 212 of the front panel 162, 262 and form flat areas towards the upper (second) end 114, 214 when the adjustable ventilation opening 74 is in an open position. This uneven expansion of the pleats 69 will impair airflow through the ventilation screen and to remedy this, at least one of the net connections 132, 134, 234 in the guiding system is a fixed connection 132. The fixed connection is attached both to the stretchable wire 121 and the insect netting 110 of the front panel 162 at a point located somewhere between the first and second ends 112, 114 of the front panel 162 (see FIG. 3). The fixed connection 132 enables the stretchable wire 121 to lift the lower pleats 69 of the front panel 162a certain distance when the adjustable ventilation opening 74 is in an open position. This facilitates maintaining all the pleats 69 of the front panel 162 in an accordion-style formation and thereby provide a higher airflow through the insect netting 110. In the embodiment shown in FIG. 4 there is no fixed connection between the stretchable wire 221 and the insect netting 210. However, it is possible to provide a fixed connection also in this embodiment of the guiding arrangement 220.

The fixed connection 132 may be a plastic or metal clip, a knot, a welding, or a glue joint which joins the stretchable wire 121, 221 to the insect netting 110, 210 of the front panel 162, 262. Advantageously, the fixed connection 132 is located between a third and two thirds of the distance, from the first end 112, 212 of the front panel 162, 262 when the adjustable ventilation opening 74 is in a fully open position. Preferably the fixed connection 132 is located halfway between the first and second ends 112, 212, 114, 214 of the front panel 162, 262 when the adjustable ventilation opening 74 is in a fully open position.

To further aid proper folding and unfolding of the accordion-style pleats 69 during the opening and closing operation of the adjustable ventilation opening 74, there is advantageously provided further net connections 134, 234 between the stretchable wire 121, 221 and the front panel 162, 262. However, these net connections 134, 234 are not fixed to the stretchable wire 121, 221, but only to the front panel 162, 262. The additional net connections 134, 234 (besides the fixed connection described above), are sliding connections 134, 234 which will connect the stretchable wire 121, 221 to the front panel 162, 262, but still allow the pleats 69 of the front panel 162, 262 to slide along the stretchable wire 121, 221. The sliding connections 134, 234 may be e.g., running loops or eyelets fixed to one or more of the pleats 69 of the front panel 162, 262 through which the stretchable wire 121, 221 may slide when the adjustable ventilation opening 74 is opened or closed.

The net connections 132, 134, 234 provide mechanical support points between the stretchable wire 121, 221 and the insect netting 110, 210 of the front panel 162, 262. Ideally there is one fixed connection 132 which will lift the stack of pleats 69 promoting an accordion-type formation of the insect netting 110, 210, while preferably one or more sliding connection 134, 234 are provided along the stretchable wire 121, 221 on either side of the fixed connection. If the distance $d_{open}$ between the first and second end 112, 212, 114, 214 of the front panel 162, 262 is very long when the adjustable ventilation opening 74 is in a fully open position, additional sliding connections 134, 234 such as two, three or more sliding connections 134, 234 may be provided on either side of the fixed connection. The sliding connections 134, 234 will prevent the insect netting 110, 210 of the front panel 162, 262 from being caught by the wind and aid the folding and unfolding of pleats 69 during the opening and closing of the adjustable ventilation opening 74.

The key to successful folding and unfolding of the pleats 69 in the accordion-style ventilation screen 60, is that the stretchable wire 121, 221 used in the guiding arrangement 120, 220 disclosed herein is maintained in a tensioned state when the adjustable ventilation opening 74 is in a closed position, a fully opened position, and all positions therebetween.

To maintain the stretchable wire 121, 221 in a constant tensioned state it must have a total non-tensioned length/w which is 1-10%, preferably 3-6%, shorter than the sum of the first distance $d_1$ (i.e., the distance between the first guiding means 141, 241 and the first wire attachment point 142, 242), and the second distance $d_2$ (i.e., the distance between the second guiding means 143, and the second wire attachment point 144) when the adjustable ventilation opening 74 is in a fully closed position. Here it should be pointed out that when the adjustable ventilation opening 74 is in a fully closed position, the distance between the first and second ends 112, 212, 114, 214 of the front panel 162, 262 is close to zero since the only parts influencing the distance between the two guiding means is the stack of neatly piled pleats 69 and net connections 132, 134, 234 (i.e., the fixed connection 132 and the sliding connections 134, 234 described above) between the stretchable wire 121, 221 and the front panel 162, 262.

In the embodiment of FIG. 4, i.e., the guiding arrangement 220 comprising only the first extended section 222 of the stretchable wire 221, the stretchable wire (221) has a total non-tensioned length ($l_w$) which is 1-10%, preferably 3-6%, shorter than the first distance ($d_1$) extending between the first guiding means 241 and the first attachment point 242.

By providing a stretchable wire 121, 221 having a length/w which is slightly shorter than the total distance from the first wire attachment point 142, 242 to the second wire attachment point 144 when the stretchable wire 121, 221 passes by the first and second guiding means 141, 241, 143, also when the adjustable ventilation opening 74 is in a closed position, the stretchable wire 121, 221 will be maintained in a tensioned state, regardless of whether the adjustable ventilation opening 74 is in a fully open or closed position, or somewhere in between.

As can be seen in FIGS. 3 and 4, there are no fixed attachments between the stretchable wire 121, 221 and the insect netting 110, 210 at the first and second ends 112, 212, 114, 214 of the front panel 162, 262. Instead, the stretchable wire 121, 221 is guided past guiding means 141, 241, 143, which are arranged directly onto the insect netting 110, 210 at the first and/or the second ends 112, 212, 114, 214 of the front panel 162, 262. Thereafter the stretchable wire 121, 221 is extended away from the guiding means 141, 241, 143 into a first extended section 122, 222 a first distance $d_1$ which is at least 15%, preferably at least 50%, more preferably at least 60% longer than the distance $d_{open}$ between the first and second ends 112, 212, 114, 214 of the front panel 162, 262 when the adjustable ventilation opening 74 is in a fully open position. Advantageously $d_1$ is from about 15% to about 110%, preferably from about 30% to about 100%, more preferably from about 40% to about 90%, more preferably from about 50% to about 80% longer than $d_{open}$.

When the guiding arrangement 120 comprises a second guiding means 143, the stretchable wire 121, 221 is also extended away from the second guiding means 143 into a second extended section 124 by a second distance $d_2$. The sum of the first distance $d_1$ and the second distance $d_2$ is at least 50%, preferably at least 100% longer than the distance $d_{open}$ between the first and second ends 112, 114 of the front panel 162 when the adjustable ventilation opening 74 is in a fully open position. Advantageously the sum $d_1+d_2$ is from about 50 to about 150%, preferably from about 60% to about 130%, more preferably from about 70% to about 120%, more preferably from about 80% to about 110% longer than $d_{open}$.

The extended sections 122, 124, 222 of the stretchable wire 121, 221 which are extended away from the guiding means 141, 241, 143 towards the wire attachment points 142, 242, 144 decrease the relative elongation of the stretchable wire 121, 221 when the adjustable ventilation opening 74 is in an open position and thereby the overall material strain on the stretchable wire 121, 221 is drastically decreased. Here, the relative elongation of the stretchable wire is intended to mean the tensioned length ($L_1$)–the relaxed length ($L_0$) divided by the relaxed length ($L_0$)×100% as follows:

$$\text{relative elongation} = \left(\frac{L_1 - L_0}{L_0}\right) \times 100\%$$

The choice of material for the stretchable wire 121, 221 must be adapted to the fully extended state of the stretchable wire 121, 221, i.e., when the adjustable ventilation is in a fully opened position. Advantageously a relative elongation of between 1-40% is suitable for a rubber wire allowing it to sustain the mechanical fatigue for many years.

In the netting support system 100 with guiding means 141, 143 arranged at both ends 112, 114 of the front panel 162, the first and second wire attachment points 142, 144 wherein the first and second ends of the stretchable wire 121 are attached, may be arranged in separate spots. However, advantageously they are arranged at the same location such that they form one common wire attachment point for both the first and second ends of the stretchable wire 121 as can be seen in FIG. 3.

The netting support system 100, 200 with the stretchable wire 121, 221 disclosed herein offers many advantages to greenhouse owners.

Since the netting support system 100, 200 with the guiding arrangement 120, 220 disclosed herein is flexible, it may easily be adapted to other installations provided inside the greenhouse 50. Wide adjustable ventilation openings 74 may easily include more than one guiding arrangement 120, 220, such as two, three or more guiding arrangements 120, 220 at regular intervals along the front panel 162, 262.

The solution with a stretchable wire 121, 221 which is connected to the front panel 162, 262 by means of the fixed and sliding connections 132, 134, 234 provides good mechanical support to the netting support system 100, 200, and enables the pleats 69 of the accordion-style ventilation screen 60 to remain on the inside of the ventilation opening 74 also at low opening angles of the adjustable ventilation window 80.

Due to the extended sections 122, 124, 222 of the stretchable wire 121, 221 which extend away from the front panel 162, 262 and the guiding means 141, 241, 143 towards the wire attachment points 142, 144, 242, the strain (i.e., the tension force) on the part of the stretchable wire 121, 221 supporting the front panel 162, 262 can be decreased considerably. The decreased strain makes it possible to arrange the guiding means 141, 241, 143 directly onto the insect netting 110, 210 of the front panel 162, 262 and thereby avoid mounting the netting support system onto greenhouse constructions such as window frames or support beams in ventilation openings 74.

This is very advantageous since the guiding arrangement 120, 220 with the stretchable wire solution 120, 220 and net connections 132, 134, 234 described herein can be mounted directly onto the insect netting 110, 210 of the front panel 162, 262 already during the confectioning of the accordion-style assemblies. Also, the first and second ends of the stretchable wire 121, 221 may be prepared with required wire attachments ready for connection to wire attachment points 142, 144, 242. Without any large or stiff components, the netting support system 100, 200 which includes the guiding arrangement 120, 220 already connected to the accordion-style ventilation screen 60 can be folded and packed together, thereby requiring minimum efforts at the installation site.

The netting support system 100, 200 as described above is advantageously mounted in an adjustable ventilation opening 74 located on a greenhouse roof 51 with a slanting top surface. In one example, the adjustable ventilation opening 74 may comprise a first framework that defines a ventilation opening 74, and a rectangular ventilation window 80 that covers the ventilation opening 74.

The ventilation window 80 may be hingeably connected to the first framework to hinge around a hinge axis between a closed position in which the ventilation window 80 extends substantially parallel to the first framework, and an open position in which the ventilation window 80 is oriented oblique with respect to the first framework to form a ventilation passage. The ventilation window 80 advantageously comprises a windowpane 81 and a second framework along at least a distal front edge 83, a back edge 84 and two parallel side edges 85 of the windowpane 81. The windowpane 81 is translucent and may be made from glass, hardened glass, or plastic such as polycarbonate.

The first framework defining the ventilation opening 74 comprises two parallel side support beams 71 and a parallel front and back support beam 72, 73 arranged perpendicular to the two parallel side support beams 71. The two parallel side support beams 71 and parallel front and back support beams 72, 73 form a rectangular opening 74 into which the rectangular ventilation window 80 can fit. The ventilation window 80 is hingeably connected to the back support beam of the ventilation opening 74.

The first end 112, 212 of the front panel 162, 262 in the netting support system 100, 200 is connected to the distal front edge 83 of said ventilation window 80, and the second end 114, 214 of the front panel 162, 262 is connected to the front support beam 72 defining a ventilation opening 74. The side panels 61 are connected to the side support beams 71 and side edges 85 of the first framework and ventilation window 80 respectively.

In one embodiment the first wire attachment point 142, 242 is arranged on the back support beam 73 of the first framework near the hinge. In case the netting support system 100, 200 comprises a first and a second guiding means 141, 241, 143, also the second wire attachment point 144 is advantageously arranged on the back support beam 73 near the hinge. In one advantageous embodiment both the first and second wire attachment points 142, 242, 144 are arranged in the same spot on the back support beam. By arranging the wire attachment points 142, 242, 144 on the back support beam 73 of the adjustable ventilation opening 74, the stretchable wire 121, 221 is extended away from the guiding means a distance d which is long enough to reduce the relative elongation of the stretchable wire 121, 221 when the adjustable ventilation opening 74 is in an open position. Another advantage of having the wire attachment points near the hinge is that the two distances $d_1$ and $d_2$ between the guiding means and the wire attachment points are similar, thereby guiding the fixed lifting point 132 towards the mid-region between the first and second guiding means 141, 143, and distributing the pleats 69 more evenly over the front panel 162, 262.

As explained above, the guiding means are advantageously mounted directly onto the insect netting 110, 210 on the first and/or second end of the front panel. However, in an alternative embodiment, the first and/or second guiding means 141, 241, 143 may also be arranged on the front distal edge of the ventilation window 80 and/or on the front support beam 72 of the first framework. This may require extra work during the mounting of the netting support system 100, 200 in the adjustable ventilation opening 74, but it also allows for using a stretchable wire 121, 221 with higher tensile strength.

Alternatively, the first and second wire attachment points 142, 242, 144 are attached to the ceiling construction of the greenhouse interior (not shown).

EXAMPLES

Example 1—Rubber Wire and Sewn Loops

Figure 6A:
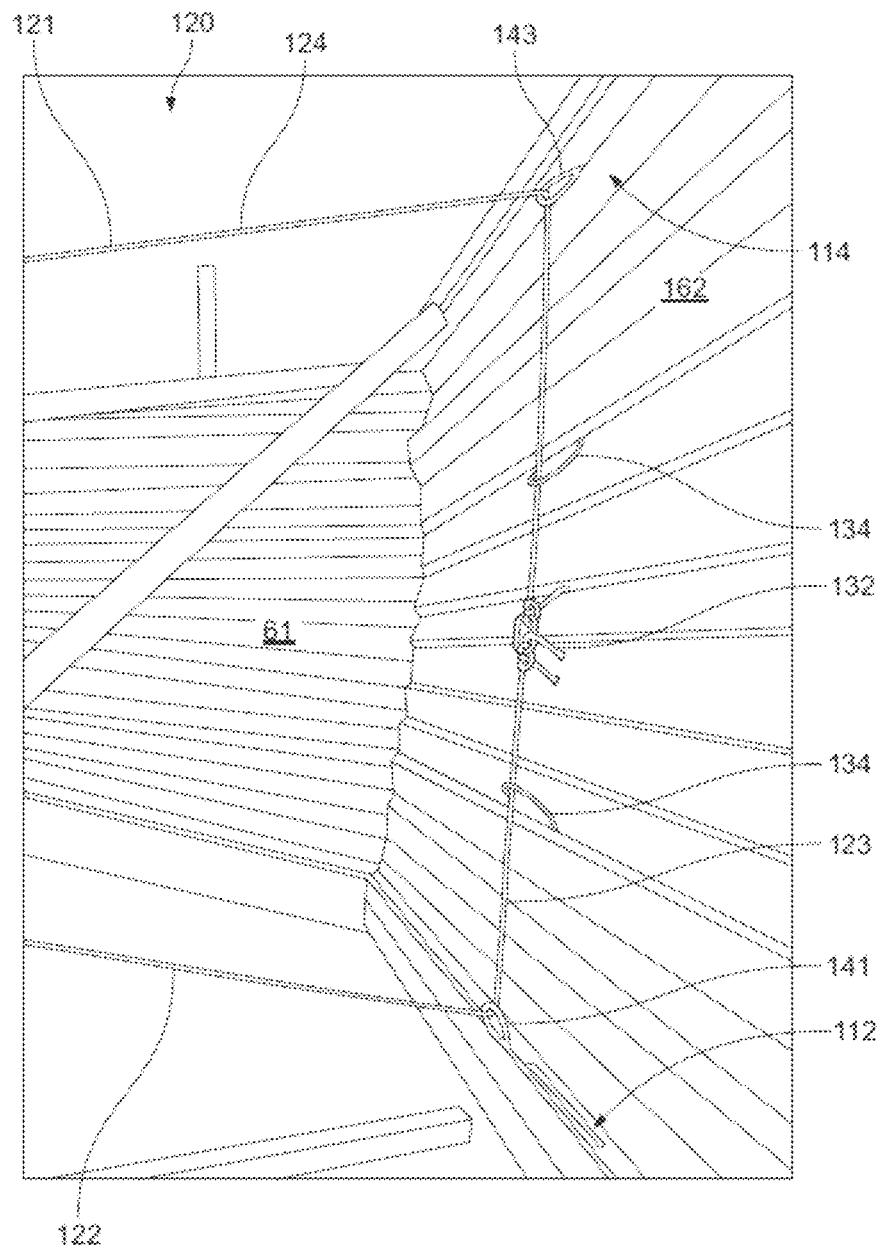
FIG. 6a is a view of the netting support system described in Example 1.

FIG. 6a discloses one embodiment of a netting support system as described herein which has been mounted in a roof top ventilation opening having a dimension of 1200 mm×1900 mm. The opening height of the ventilation window is 1052 mm in the fully opened position.

The front and side panels of the insect netting comprise 22 lamellas, 70 mm wide, sewn together to form accordion-style assemblies and thereafter assembled into accordion-style ventilation screens as described elsewhere herein. The accordion-style ventilation screen has been conventionally connected to the window frame with a rubber profile sewn to the lamellas and pressed into a slot in an aluminum profile of the window frame.

Figure 6B:
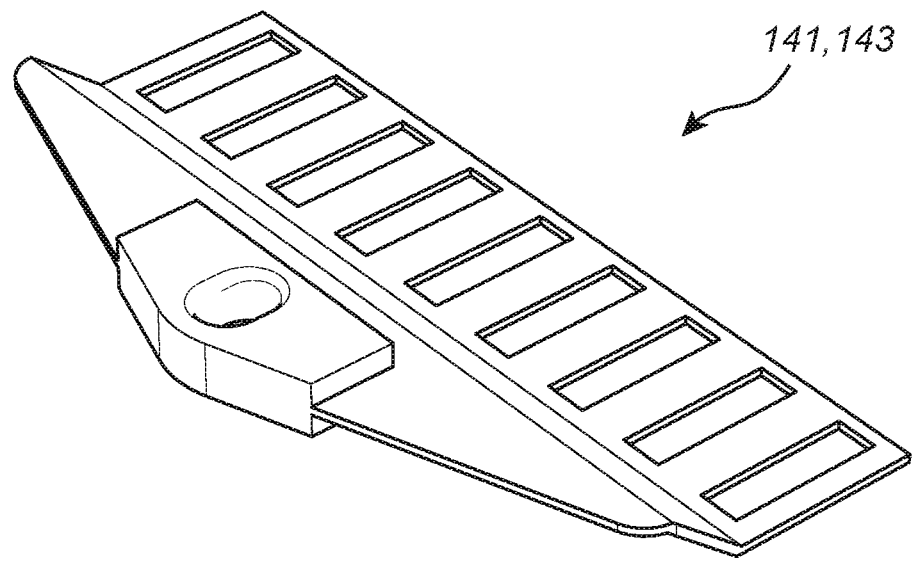
FIG. 6b is a view of a first and second guiding means of the netting support system according to one example.
Figure 6C:
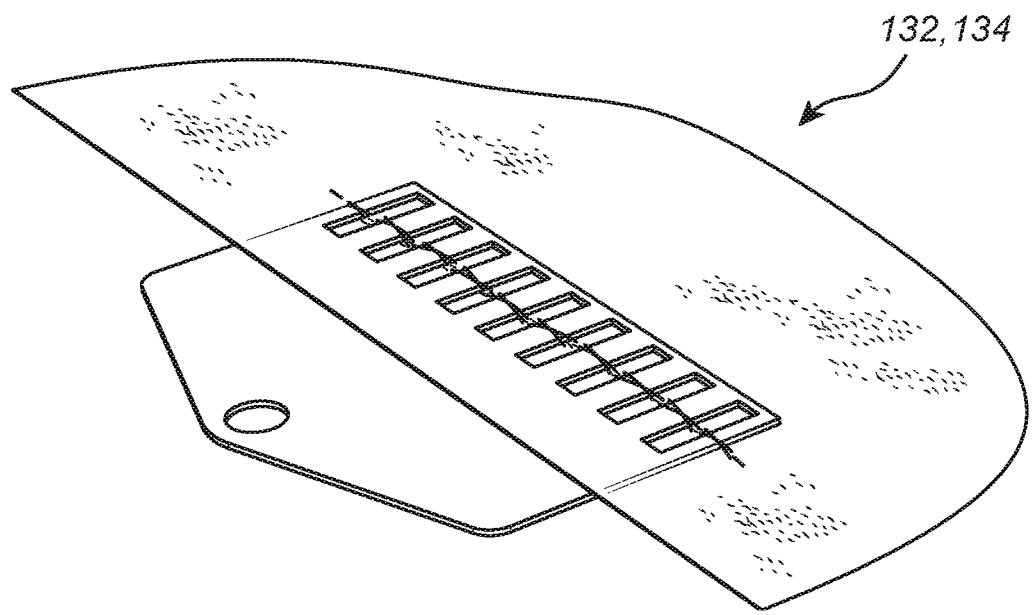
FIG. 6c is a view of a net connection of the netting support system according to one example when attached to the insect net described herein.

Net connections to be used as guiding means 141, 143 (see FIG. 6*b*) and sliding connections 134 (see FIG. 6*c*) respectively were 3D-printed from PA66 plastic with a material thickness of 1.2 mm. As can be seen in FIG. 6*b* and FIG. 6*c*, both profiles 134, 141, 143 are provided with one edge about 60 mm long comprising a pattern of elongated holes which facilitates attachment of the profile to the insect netting by sewing. To lower the abrasion on the stretchable wire, the profiles used as guiding means were provided with an area of increased material thickness (10 mm) comprising a hole with a diameter of 6 mm through which the stretchable wire passes (see FIG. 6*b*). The guiding means 141, 143 were sewn onto the insect netting 650 mm from the window corners on the inside of the front panel 162 on the first end (bottom) and second end (top) of the front panel respectively. Two sliding connections as seen in FIG. 6*c* were also sewn onto the insect netting between first and second the guiding means on either side of the fixed connection.

A fully flexible rubber wire providing the elasticity required was used as the stretchable wire 121 in the guiding arrangement 120 of the netting support system. The stretchable wire 121 used in this experimental setup is conventionally called a chock cord and contained 6 natural rubber (NR) filaments surrounded by a cover of braided polyester yarn. The stiffness of the stretchable wire was measured in a tensile test to 11 N at 50% elongation. The rubber was protected from UV degradation and abrasion by two layers of black UV protected polyester multifilament yarn braids. The total diameter of the wire was 3 mm.

A first end of the stretchable wire was connected at a first wire attachment point (not shown) in the ceiling profile located about 80 mm below the window hinge by means of a knot. The stretchable wire was extended 1180 mm in a first extended section 122 of the stretchable wire 121 towards the first (bottom) guiding means 141 on the first end 112 of the front panel 162 and guided through the hole provided in the profile. The net connecting section 123 of the stretchable wire 121 was further extended past a first sliding means 134, a fixed connection 132 and a second sliding means 134 parallel to the inside of the front panel 162 towards the second guiding means 143 connected at the second (top) end 114 of the front panel 162. In this embodiment the fixed connection 132 was provided as a simple knot between the stretchable wire 121 and the insect netting 110. Thereafter the stretchable wire 121 was guided through the hole on the second guiding means 143 and extended 1180 mm in a second extended section 124 of the stretchable wire 121 towards the second wire attachment point (not shown), which in this set up coincided with the first wire attachment point. The second end of the wire was attached to the common wire attachment point by means of a knot.

The sum of the lengths of the first and second extended sections 122, 124 of the stretchable wire 121 was 124% longer than the distance between the first and second ends of the front panel when the ventilation opening was in a fully opened position.

The total length of the stretchable wire 121, excluding knots, was 2350 mm which, when the ventilation opening is in a closed position taking into account a pre-stretch of the wire of 5%, to avoid slack and compensate for possible material relaxation.

The window, insect net and guiding system construction was fully opened and closed for 5000 cycles outdoors without any complications, such as net falling in or out, abrasion on wire, or slack.

Example 2—Guiding Arrangement with Partly Elastic Wire

FIG. 7*a* is a view of an alternative netting support system as disclosed herein.

The ventilation opening used in this example has the same dimensions and accordion-style ventilation screen as described in example 1.

However, a polyester rope with negligible flexibility provided with two steel springs 125, 126 at each end was used as the stretchable wire in the guiding arrangement instead of a rubber wire. The steel springs were 30 cm long, each with a spring constant of 25 N/m. The braided polyester rope had a diameter of 5 mm and a total length of 1780 mm excluding knots.

Figure 7B:
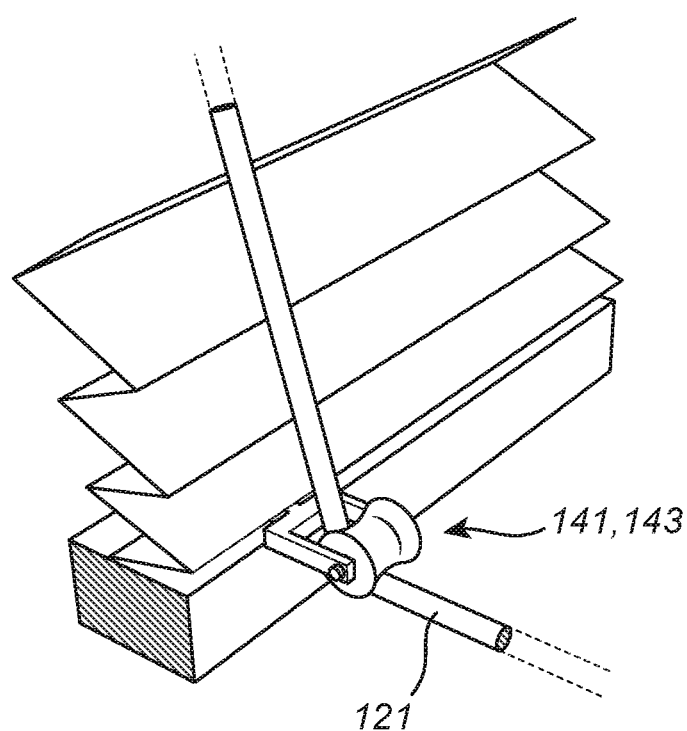
FIG. 7b is an exemplary view of a first and second guiding means of the netting support system described in Example 2.

In this embodiment polyoxymethylene (POM) plastic pulley rolls rotating on steel bolts as seen in FIG. 7*b* were used as first and second guiding means 141, 143 and were mounted onto the window distal front edge 83 and front support beam 72 of the first and second framework respectively. The POM plastic pulley rolls had an outer diameter of 15 mm at the sides and 12 mm in the middle. The width was 6 mm. The rotating rolls provide a minimum of friction and abrasion on the wire.

Figure 7C:
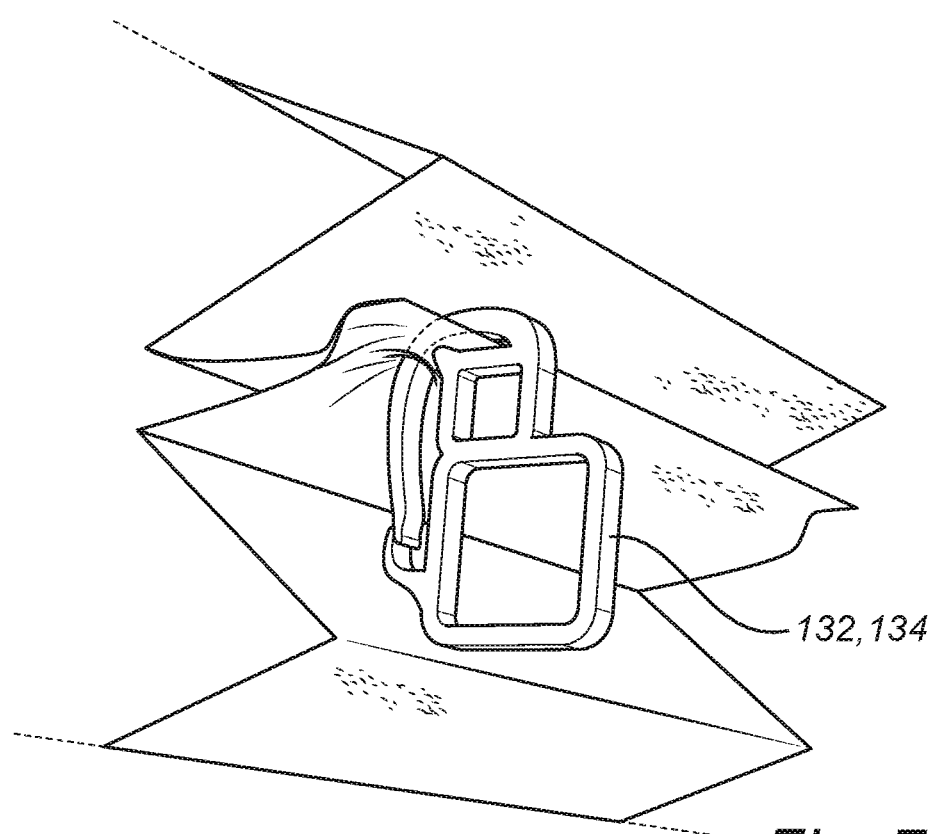
FIG. 7c is an exemplary view of a net connections of the netting support system described in Example 2.

Net connections to be used as sliding connections 134 and fixed connections 132 were injection molded from PA66 plastic into clip loops as seen in FIG. 7*c*. The clip loops pierced around the seam of the net construction and were provided with a 20 mm wide loop through which the wire can run freely. The same type of clip was used for the lifting point, but with knots on the loop.

The steel spring 125 at the first end of the stretchable wire was connected at a first wire attachment point (not shown) on a ceiling profile located about 80 mm below the window hinge by means of a bolt. The polyester rope was extended 880 mm from the first steel spring 125 attached at the first wire attachment point towards the first (bottom) guiding means 141 on the first end 112 of the front panel 162 and guided on the pulley roll of the first guiding 141 means to extend parallel to the front panel 162. From the first pulley roll the polyester rope is guided past a first clip loop acting as a sliding means (not shown), a second clip loop 132 connected to both the polyester rope and the insect netting acting as a fixed connection, a third clip loop acting as a sliding means (not shown) and towards the second guiding means 143 (a pulley roll) connected at the second (top) end 114 of the front panel 162. Thereafter the polyester rope was guided on the second pulley roll 143 and extended 880 mm towards the steel spring 126 by the second attachment point, which in this set up coincided with the first wire attachment point. The second steel spring 126 on the second end of the polyester rope was attached to the common wire attachment point by means of a bolt.

The sum of the first and second extended sections 122, 124 of the stretchable wire (polyester rope and steel springs) was 124% longer than the distance between the first and second ends 112, 124 of the front panel 162 when the ventilation opening was in a fully opened position.

As no long-term relaxations of the wire materials were expected, the setup was mounted when the window was completely closed. To have a negligible slack in the polyester rope with the springs in a close to relaxed position, the springs were extended 5 mm each.

The window, insect net and guiding system construction was fully opened and closed for 5000 cycles outdoors without any complications, such as net falling in or out, abrasion on wire, or slack.

In this embodiment, the long-term effect of degradation from sunlight was not considered.

The invention claimed is:

1. A netting support system adapted to span an adjustable ventilation opening, the netting support system comprising
an insect netting to prevent passage of insects through the adjustable ventilation opening, the insect netting being pleated in an accordion-style configuration to collapse in a stacked manner when the adjustable ventilation opening is closing, and to expand when the adjustable ventilation opening is opening; and
a guiding arrangement for the insect netting,
wherein the guiding arrangement comprises a stretchable wire, connected to at least one net connection fixedly attached to the insect netting, such that the stretchable wire maintains the insect netting in the accordion-type configuration when the insect netting spans the ventilation opening, the guiding arrangement comprising at least a first guiding means for the stretchable wire, the first guiding means being arranged on a first or second end of a front panel on the insect netting, said first guiding means guiding a net connecting section of the stretchable wire past the at least one net connection in a direction parallel to the front panel; and first and second wire attachment points for fixing a first and second end of the stretchable wire of the guiding arrangement, the first wire attachment point being arranged at a location a first distance (d1) from the first guiding means whereby when the first end of the stretchable wire is attached to the first wire attachment point, the net connecting section of the stretchable wire is guided past the first guiding means extending in a first extended section of the stretchable wire towards the first wire attachment point in a direction different from the direction of the net connecting section.

2. The netting support system according to claim 1, the second wire attachment point for the stretchable wire being arranged on an end of the front panel opposite to the end provided with the at least first guiding means.

3. The netting support system according to claim 2, wherein the stretchable wire has a total non-tensioned length ($l_w$) which is 1-10%, shorter than the first distance (d1) extending between the first guiding means and the first attachment point.

4. The netting support system according to claim 1, wherein the at last one net connection is a fixed connection fixedly attached to the insect netting and the stretchable wire between the first and second ends of the front panel.

5. The netting support system according to claim 4, wherein the fixed connection is arranged on the insect netting at ⅓ to ⅔ of the distance from the first end to the second end of the front panel.

6. The netting support system according to claim 1, wherein the at last one net connection is a sliding connection fixedly attached to the insect netting between the first and second ends of the front panel, the sliding connection guiding the stretchable wire therethrough and parallel to the front panel.

7. The netting support system according to claim 1, wherein the stretchable wire is an elastic wire.

8. The netting support system according to claim 1, wherein the stretchable wire is only partly elastic.

9. The netting support system according to claim 1, wherein the first distance (d1) between the first guiding means and the first wire attachment point is at least 15%, longer than a distance ($d_{open}$) between the first and second ends of the front panel when the adjustable ventilation opening is in a fully open position.

10. The netting support system according to claim 9, the guiding arrangement comprising a second guiding means for the stretchable wire, the first and the second guiding means are arranged on opposite ends of the front panel and guiding the net connecting section of the stretchable wire between the first and second guiding means in a direction parallel to the front panel, the at least one net connection being arranged between the first and second guiding means.

11. The netting support system according to claim 10, wherein the second wire attachment point for the stretchable wire is arranged at a location a second distance ($d_2$) from the second guiding means, whereby when the second end of the stretchable wire is attached to the second wire attachment point, the net connecting section of the stretchable wire is guided past the second guiding means extending in a second extended section of the stretchable wire towards the second wire attachment point in a direction different from the direction of the net connecting section.

12. The netting support system according to claim 11, wherein the sum of the first distance ($d_1$) extending between the first guiding means and the first attachment point, and the second distance ($d_2$) extending between the second guiding means and the second attachment point is at least 50%, longer than the distance ($d_{open}$) between the first and second ends of the front panel when the adjustable ventilation opening is in a fully open position.

13. The netting support system according to claim 12, wherein the stretchable wire has a total non-tensioned length ($l_w$) which is 1-10%, shorter than the sum of the first distance ($d_1$) extending between the first guiding means and the first attachment point, and the second distance ($d_2$) extending between the second guiding means and the second attachment point.

* * * * *